May 28, 1968   E. H. RUF   3,384,950

METHOD OF MAKING BEARING MATERIAL

Filed June 24, 1965   2 Sheets-Sheet 1

INVENTOR.
Ernst H. Ruf
BY
His Attorney

May 28, 1968

E. H. RUF 3,384,950

METHOD OF MAKING BEARING MATERIAL

Filed June 24, 1965

ETCHED SURFACE

SN-AL ALLOY

SN-AL ALLOY

BOND LINE

AL

BOND LINE

STEEL

INVENTOR.
Ernst H. Ruf

BY
His Attorney

United States Patent Office 3,384,950
Patented May 28, 1968

3,384,950
METHOD OF MAKING BEARING MATERIAL
Ernst H. Ruf, Dayton, Ohio, assignor to General Motors Corporation, Detroit, Mich., a corporation of Delaware
Filed June 24, 1965, Ser. No. 466,664
8 Claims. (Cl. 29—487)

ABSTRACT OF THE DISCLOSURE

A composite metal strip, comprising a layer of aluminum-tin alloy which is joined to an aluminum coated steel backing by means of a strong coextensive bond, suitable for manufacturing bearings and the like is formed by etching a surface of an annealed aluminum-tin alloy strip to remove substantially all of the tin therefrom, heating the aluminum-tin strip to about 425° F., heating an aluminum coated steel strip to about 450° F., passing the two strips with the etched surface of the one and the aluminum coated surface of the other in juxtaposition between rollers under suitable pressure whereby the tin-aluminum layer is substantially reduced in thickness and a strong coextensive bond is obtained between the tin-free surface and the aluminum coated steel layer.

---

This invention relates to composite bearing material and is particularly concerned with a method for making a composite bearing having a commercially available tin-aluminum alloy bearing surface bonded to an aluminum coated steel supporting back.

It is, therefore, the main object of this invention to provide a method for coextensively attaching a tin-aluminum alloy having tin in a percentage of from 7 to 30%, with the remainder being essentially aluminum, to a steel supporting back having an aluminum coating thereon wherein a strong coextensive bond is provided which permits subsequent forming of the component strip material.

In carrying out the above object it is a further object to treat at least the bonding surface of the tin-aluminum strip prior to attaching it to the steel by etching wherein the etch provides substantially pure aluminum at the bonding surface which is essentially free from tin whereby the subsequent bond is improved.

It is a further object of the invention to provide a method for making composite bearing material for subsequent use in the manufacture of engine bearings and the like wherein a bearing layer is provided having tin in a percentage of from 17 to 23%, copper 1% with aluminum making up substantially the remainder wherein the tin-aluminum layer in recrystallized form is coextensively bonded to an aluminum coated steel supporting member.

Further objects and advantages of the present invention will be apparent from the following description, reference being had to the accompanying drawings, wherein preferred embodiments of the present invention are clearly shown.

Figure 1:
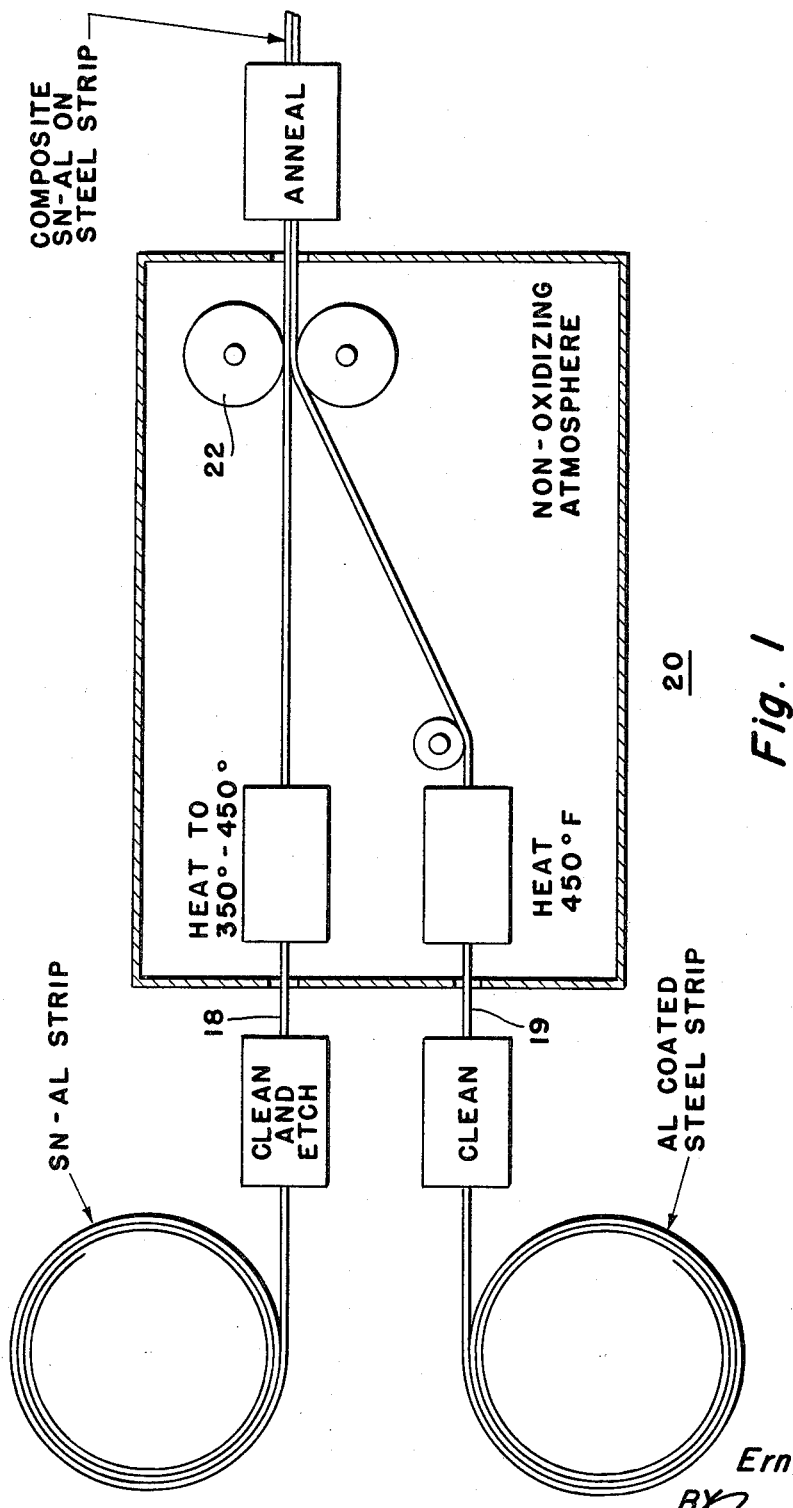
Figure 2:
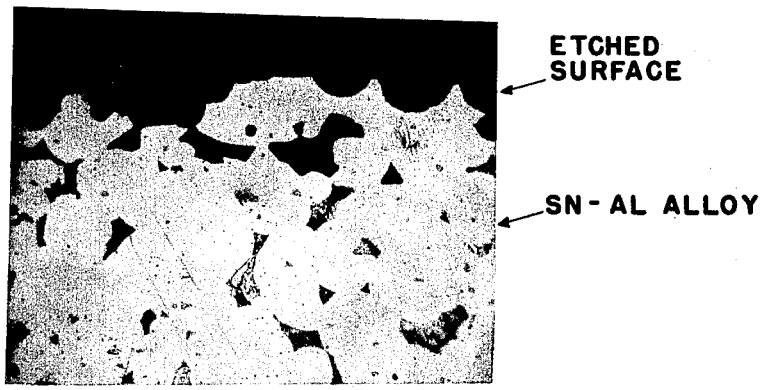
Figure 3:
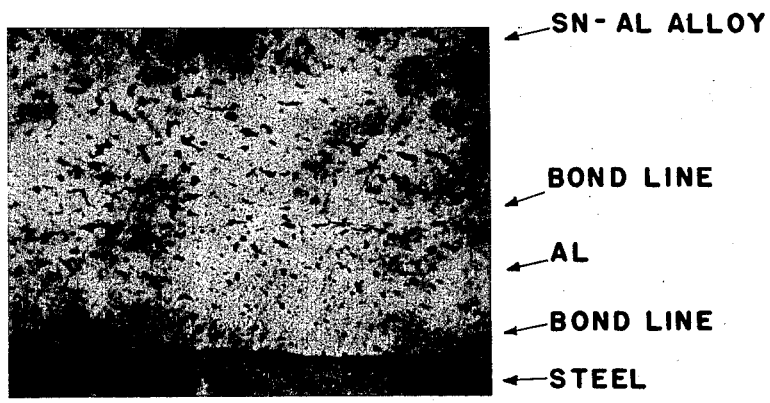

In the drawings:
FIG. 1 is a diagrammatic view showing the apparatus used to accomplish the method claimed herein.
FIG. 2 is a photomicrograph (500×) of the tin-aluminum (79% Al, 20% Sn, 1% Cu) cladding surface after etching, and
FIG. 3 is a photomicrograph (150×) of a heat treated tin-aluminum (79% Al, 20% Sn, 1% Cu) alloy layer bonded to aluminum coated SAE 1008 steel, wherein an aluminum coating is shown, taken at the bond lines.

Heavy duty bearings for use in automotive engines and the like require a number of properties in order to be satisfactory for use in a wide range of applications. These bearings must be score resistant and have a reasonable degree of embeddability, must be resistant to corrosion due to products of combustion and engine oil and above all must be fatigue resistant. Until now, tin-babbitt bearings have been satisfactory in most instances with the exception of fatigue resistance. However, due to the increasingly high loads placed on engine bearings, tin-babbits have not been able to meet fully the requirements and improved bearing materials are needed that will have all of the above noted desirable characteristics.

I have found that a tin-aluminum alloy wherein the tin range is from 7 to 30% together with about 1% copper and the remainder aluminum comprises a bearing alloy which has all of the above properties and which is capable of being produced economically for subsequent use in modern automotive engines. Preferably, the tin ranges from 17 to 23% with the most desirable figure being about 20% wherein the copper remains constant and the aluminum makes up the remainder. This material, however, requires a backing since to make an entire bearing shell of the material would be too costly. Therefore, it is desirable to use the tin-aluminum as a bearing layer which is bonded coextensively to an aluminum coated steel supporting back. Numerous approaches towards obtaining a satisfactory bond have been made in the past and in most instances problems have occurred which create difficulties in the use of the bearing. For example, brittle iron-aluminum interlayers at the bond line between the bearing alloy and the steel, poor bonds between the two layers that lack coextensivity and which fracture with use and numerous other problems that create conditions which have held back the use of this rather useful bearing alloy, have all been present.

I have found that the problem of bonding tin-aluminum alloy to steel may be overcome by the proper pretreatment of the tin-aluminum alloy wherein the alloy is annealed for a substantial period of time at an elevated temperature for recrystallizing the aluminum therein. The next important step is to etch at least the bonding surface with an acid etchant for removing the tin which leaves the substantially pure aluminum as a framework or network essentially devoid of tin. This substantially tin-free aluminum is in a very thin stratum (or strata) but is sufficient to permit coextensive bonding of the tin-aluminum layer to the aluminum coated steel when the two layers are heated and are rolled together under controlled temperature conditions and at substantial pressures for reducing the thickness of the tin-aluminum layer and for bonding the same coextensively to the aluminum coated steel. This bond is later enhanced by additional heat treating for again recrystallizing the aluminum. Thereafter, the strip may be cut into suitable lengths and formed into bearings which can be machined to the critical tolerances required for this type of bearing. It is to be understood that while the method disclosed herein requires an annealing step to recrystallize the aluminum at the start of the method, the alloy may be purchased on the market in this condition which would obviously eliminate the necessity of this step. Furthermore, while 1% copper is disclosed as a desirable additive amount, this may range up to 3% if desired. However, as the copper content increases, hardness of the bearing layer also increases which is not generally desirable and therefore, a copper addition in the order of 1% is generally preferred wherein the copper acts to improve fatigue resistance. Of course, copper may be left out entirely, if desired. The recrystallization steps referred to re-establish the aluminum alloy layer to a hardness condition essentially similar to that found in "as cast" material and improves the ductility of the material.

In order to more fully understand the invention, the following example is given wherein exact conditions are offered for one procedure which may be used to produce the bearing structure. An alloy, containing 20% tin, 1% copper, balance aluminum, in strip form is heated for from 4 to 18 hours at 550° to 750° F. and preferably for sixteen hours at 680° F. and is then air cooled. This anneals the strip or places the aluminum in a recrystallized condition which is the reason for this step. The annealed strip is next immersed in a sodium hydroxide solution containing from 16 to 32 oz. and preferably 30 oz. of caustic flakes per gallon and maintained at 190° F. ±15°, the time of immersion being from 5 to 45 seconds. Thereafter, the strip is washed thoroughly in cold water and rinsed. The strip is next immersed in an 18% to 22% solution of nitric acid, 20% being preferred, and maintained at about 212° F. ±10°, for five minutes. During this period the tin at the surface is dissolved out leaving a substantially pure aluminum network. The tin-aluminum alloy is then washed in cold water, rinsed in hot water and dried with forced air.

The steel used in the bearing is preferably SAE 1010 or SAE 1008, or other suitable low carbon steel having an aluminum or aluminum alloy coating thereon wherein the bond line between the aluminum coating and the steel is devoid of a brittle iron-aluminum interlayer. This coating may be applied by various methods one of which is disclosed in Mushovic et al. Patent 2,782,498, assigned to the assignee of the present invention. In general, an aluminum or aluminum alloy coating of between .0001" to .01" is fully sufficient to provide a bonding surface. The thickness of this coating should be determined so as to be compatible to the type of bearing and economic considerations. This coated steel strip is then degreased and annealed or normalized and is then washed with trisodium phosphate or other commercial cleaner, or it may be roughened with grit paper or wire brush at the bonding side with care being taken not to remove the coating. Thereafter, the aluminum coated steel is water rinsed and air dried.

The prepared tin-aluminum strip 18 and the prepared aluminum coated steel strip 19 are next passed through preheating apparatuses 20 as shown diagrammatically in FIG. 1 wherein the tin-aluminum strip is heated to a temperature of between 350° and 450° F. and preferably about 425° F. while the aluminum coated steel is brought to a temperature of about 450° F. These temperatures may vary provided the tin-aluminum at the interface does not exceed about 450° F. The two strips with the etched side of the tin-aluminum and the roughened side of the aluminum coated steel in juxtaposition are then passed through cladding rolls 22 maintained at a temperature which is sufficient to prevent cooling and/or overheating of the juxtaposed strips as they pass therethrough. In the specific embodiment being described, the roll diameter was eight inches and the speed about 11 feet per minute. The speed will vary with roll diameter and/or temperature control factors. Lubricant is generally used on the roll in contact with the tin-aluminum to prevent any possibility of sticking. During this rolling operation the tin-aluminum strip is reduced in thickness by about 50% to 80% while the aluminum coated steel is reduced in thickness from about 15% to 35%. As the component strip emerges from the rolls the tin-aluminum is bonded coextensively to the steel through the aluminum layer thereon. In practice, the two strips after cleaning and cladding, are maintained in a non-oxidizing atmosphere as indicated in FIG. 1. This bond is enhanced and improved by annealing the strip such as by passing the strip through a commercial salt bath for a period of about ten minutes with the bath at 700° F. As it emerges from the bath the component strip is air cooled. This last mentioned anneal or heat treatment enhances the bond and recrystallizes the aluminum in the tin-aluminum strip. During this heat treatment some tin may sweat out at the surface of the tin-aluminum layer and this must be mechanically removed but close control of temperature and time will eliminate or reduce this difficulty. Sweat-out, however, is not of great importance since the finished broaching step during the finish machining of the bearing removes from between .005" and .007" of material and this will eliminate the tin depleted strata adjacent the surface and reestablish the desired percentage of tin at the machined surface. The heat treatment or annealing step may be accomplished in any other conventional manner so long as the aluminum becomes recrystallized. For example, the strips may be heated in an air furnace for from 1½ to 2 hours at a temperature of from 660° to 680° F. or at a temperature and for a time to accomplish the desired recrystallization, followed by cooling in air or by a water quench as desired.

It is understood that composite strip stock made by the process noted may subsequently be cut into the desired lengths, formed and machined to produce precision engine bearings which have a high degree of fatigue resistance as set forth heretofore.

It is understood that the specific times and temperatures noted in the example given herein may vary within suitable limits as is well known to those skilled in the art. The important contributions made by the present invention involve bringing the surface of the tin-aluminum strip to a substantially pure aluminum bonding surface whereby sweating of tin and other problems that have heretofore been present are eliminated. This step permits a coextensive bond to be formed that is strong and has the degree of ductility necessary to permit subsequent forming of the strip material into engine bearings. This has not been the case in bearings made heretofore utilizing tin-aluminum material and in many instances additional interlayers have been required in order to obtain a satisfactory bond, such interlayers being unnecessary with the present invention whereby the tin-aluminum may be attached coextensively with a strong bond directly to the aluminum coating on the steel backing.

It is understood that while a tin-aluminum alloy with a minor quantity of copper is disclosed that small additions up to about 5% of other metals is contemplated where such additions are desirable for specific physical properties and performance. For example, such additional alloying ingredients as cadmium, magnesium silicon, etc., may be useful in small quantities and frequently offer improved properties for specific applications.

While the embodiments of the invention as herein disclosed constitute preferred forms, it is to be understood that other forms might be adopted.

What is claimed is as follows:

1. In a method for making a composite bearing material comprising a tin-aluminum bearing surface having tin in a percentage of from 7% to 30% with aluminum substantially making up the remainder, said tin-aluminum layer being coextensively bonded to a steel supporting back having an aluminum coating thereon, the steps comprising; providing an annealed tin-aluminum strip of the desired composition, etching at least the bonding surface of said tin-aluminum strip to remove substantially all the tin therefrom, providing an aluminum coated steel strip, operating on the aluminum surface of said steel strip for providing a clean surface thereon, rolling the aluminum coated steel strip and the tin-aluminum strip together between rolls with the cleaned aluminum coated surface of the steel strip in juxtaposed relation to the etched surface of the tin-aluminum strip, bringing the temperature of said strips at the bight of said rolls to an elevated temperature which does not exceed appreciably the melting point of tin and which is sufficient to promote the bonding of the tin-aluminum strip to the coated steel strip while substantially reducing the thickness of the tin-aluminum strip from its initial thickness whereby the tin-aluminum strip becomes bonded coextensively to the coated steel strip, heat treating the composite strip for recrystallizing the aluminum in the tin-aluminum layer, then cooling the strip, and finally cutting bearing blanks from said strip for subsequent formation into bearings.

2. In a method for making a composite bearing material comprising a tin-aluminum bearing surface having tin in a percentage of from 7% to 30% with aluminum substantially making up the remainder, said tin-aluminum layer being coextensively bonded to a steel supporting back having an aluminum coating thereon, the steps comprising; providing a tin-aluminum strip of the desired composition, annealing said tin-aluminum strip to soften the same for facilitating the subsequent bonding operation, treating at least the to be bonded surface of said tin-aluminum strip by etching the surface thereof to remove substantially all the tin therefrom, providing an aluminum coated steel strip, operating on the coated surface of said steel strip for providing a clean surface thereon, rolling the coated steel strip and the tin-aluminum strip together between rolls with the cleaned coated surface of the steel strip juxtaposed to the etched surface of the tin-aluminum strip, bringing the temperature of said strips at the bight of said rolls to an eleveated temperature which does not exceed appreciably the melting point of tin and which is sufficient to promote bonding of the tin-aluminum strip to the coated surface of the steel strip while reducing the thickness of the tin-aluminum strip by between 50% and 80% of its initial thickness whereby the tin-aluminum strip becomes bonded coextensively to the coated steel strip, heat treating the composite strip for recrystallizing the aluminum in the tin-aluminum layer, then cooling the strip, and finally cutting bearing blanks from said strip for subsequent formation into bearings.

3. In a method for making a composite bearing material having a bearing layer including tin in a percentage of 17% to 23% with aluminum essentially making up the remainder, said tin-aluminum layer being in the recrystallized form and bonded to a steel supporting back having an aluminum coating thereon, the steps comprising; etching at least the bonding surface of annealed tin-aluminum strip to remove substantially all the tin therefrom, providing a coated steel strip, operating on the coated surface of said steel strip for providing a clean surface thereon, rolling the coated steel strip and the tin-aluminum strip together between rolls with the cleaned coated surface of the steel strip in juxtaposed position to the etched surface of the tin-aluminum strip, maintaining the apparent temperature of said strips at the bight of said rolls to between about 350° and 450° F. while reducing the thickness of the tin-aluminum strip from between 50% and 80% of its initial thickness whereby the tin-aluminum strip becomes bonded coextensively to the coated steel strip, heat treating the composite strip for recrystallizing the aluminum in the tin-aluminum layer, then cooling the strip, and finally cutting bearing blanks from said strip for subsequent formation into bearings.

4. In a method for making a composite bearing material having a bearing layer including tin in a percentage of 17% to 23% with aluminum essentailly making up the remainder, said tin-aluminum layer being in the recrystallized form and bonded to a steel supporting back having an aluminum coating thereon, the steps comprising; treating at least the bonding surface of an annealed tin-aluminum strip with an acid etchant for providing substantially pure aluminum at the bonding surface, providing an aluminum coated steel strip, operating on the coated surface of said steel strip for providing a clean surface thereon, rolling the steel strip and the tin-aluminum strip together between rolls with the cleaned coated surface of the steel strip in juxtaposed relation to the etched surface of the tin-aluminum strip, maintaining the temperature of said strips at the bight of said rolls to between about 350° to 450° F. while reducing the thickness of the tin-aluminum strip from between 50% to 80% of its initial thickness whereby the tin-aluminum strip becomes bonded coextensively to the coated steel strip, heat treating the composite strip for recrystallizing the aluminum in the tin-aluminum layer, then cooling the strip, and finally cutting bearing blanks from said strip for subsequent formation into bearings.

5. In a method for making a composite bearing material comprising a tin-aluminum bearing layer having tin in a percentage of from 17% to 23% with aluminum making up essentially the remainder, said tin-aluminum layer being bonded to a steel supporting back having an aluminum coating thereon, the steps comprising; treating at least the bonding surface of an annealed tin-aluminum strip with a dilute nitric acid solution for a period sufficient to remove substantially all of the tin from said surface so as to present a substantially pure aluminum surface, providing a steel strip, operating on the aluminum coated surface of said steel strip for providing a clean surface thereon, rolling the coated steel strip and the tin-aluminum strip together wetbeen rolls with the cleaned coated surface of the steel strip juxtaposed to the etched surface of the tin-aluminum strip, maintaining the temperature of said strips at the bight of said rolls to between about 350° and 450° F. while reducing the thickness of the tin-aluminum strip from between 50% to 80% of its initial thickness whereby the tin-aluminum strip becomes bonded coextensively to the coated steel strip, heat treating the composite strip for recrystallizing the aluminum in the tin-aluminum layer, then cooling the strip, and finally cutting bearing blanks from said strip for subsequent formation into bearings.

6. In a method for making a composite bearing material comprising a tin-aluminum surface having tin in a percentage of from 17% to 23% with aluminum essentially making up the remainder, said tin-aluminum layer being bonded to a steel supporting back having an aluminum coating thereon, the steps comprising; providing a tin-aluminum strip of the desired composition, annealing said tin-aluminum strip at a temperature and for a time sufficient to recrystallize the aluminum in said tin-aluminum layer, etching at least the bonding surface of said tin-aluminum strip with an acid etchant to remove the tin therefrom and present substantially pure aluminum, providing an aluminum coated steel strip, operating on the coated surface of said steel strip for cleaning the same, passing the steel strip and the tin-aluminum strip together between rolls with the cleaned coated surface of the steel strip juxtaposed to the etched surface of the tin-aluminum strip, maintaining the temperature of said strips at the bight of said rolls to between about 350° and 450° F. while reducing the thickness of the tin-aluminum strip from between 50% to 80% of its initial thickness whereby the tin-aluminum strip becomes bonded coextensively to the coated steel strip, heat treating the composite strip for recrystallizing the aluminum in the tin-aluminum layer, then cooling the composite strip, and finally cutting bearing blanks from said strip for subsequent formation into bearings.

7. In a method for making a composite bearing material comprising a tin-aluminum surface having tin in a percentage of from 17% to 23% with aluminum making up substantially the remainder, said tin-aluminum layer being bonded to a steel supporting back having an aluminum coating thereon, the steps comprising; providing a tin-aluminum strip of the desired composition, annealing said tin-aluminum strip at a temperature and for a time sufficient to recrystallize the aluminum in said tin-aluminum strip, etching at least the bonding surface of said tin-aluminum strip with boiling, dilute nitric acid for a period sufficient to remove substantially all of the tin from said bonding surface so as to present substantially pure aluminum, providing an aluminum coated steel strip, operating on the coated surface of said steel strip for providing a clean surface thereon, rolling the coated steel strip and the tin-aluminum strip together between rolls with the cleaned coated surface of the steel strip in juxtaposed position to the etched surface of the tin-aluminum strip, maintaining the temperature of said strips at the bight of said rolls to between about 350° and 450° F. for reducing the thickness of the tin-aluminum strip from between 50% to 80% of its initial thickness, whereby the tin-aluminum strip becomes bonded coextensively to the coated steel strip, heat treating the composite strip for recrystallizing the aluminum in the tin-aluminum layer, then cooling the composite strip, and finally cutting bearing blanks from said strip for subsequent formation into bearings.

8. In a method for making composite bearing material comprising a tin-aluminum surface having 20% tin, 1% copper, the balance being substantially all aluminum, said tin-aluminum layer being bonded to a mild steel supporting back, the steps comprising; annealing a tin-aluminum strip of the composition desired at a temperature and for a time sufficient to recrystallize the aluminum in the tin-aluminum strip, etching the bonding surface of said tin-aluminum strip in a boiling 20% nitric acid solution for a time sufficient to remove substantially all of the tin from said bonding surface, providing a mild steel strip having a coating of aluminum thereon between .0001″ and .01″ thick and devoid of a brittle iron-aluminum interlayer at the bond line, abrading the aluminized surface of said strip for cleaning the same to present a bonding surface thereon, juxtaposing the tin-aluminum strip and the coated strip with the etched surface of the tin-aluminum strip in contact with the clean coated surface of the steel strip, rolling said strips together between rolls wheren the temperature at the bight of the rolls is maintained at about 425° F. for reducing the thickness of the tin-aluminum strip by between 50% and 80% while the coated steel strip is reduced in thickness from about 15% to 35% for bonding the tin-aluminum strip coextensively to the coated surface of the steel strip, heat treating the composite strip so formed for recrystallizing the aluminum in the tin-aluminum layer, cooling the composite strip, and finally cutting bearing blanks from said strip for subsequent formation into bearings.

References Cited

UNITED STATES PATENTS

| | | | |
|---|---|---|---|
| 2,837,818 | 6/1958 | Storchheim | 29—497.5 X |
| 3,078,563 | 2/1963 | Gould | 29—494 |
| 3,093,885 | 6/1963 | Morrison | 29—149.5 |
| 3,104,135 | 9/1963 | Morrison | 29—196.2 X |
| 3,132,418 | 5/1964 | Fulford | 29—471.1 |
| 3,195,991 | 7/1965 | Stern | 29—497.5 X |
| 3,300,837 | 1/1967 | Fisher | 29—196.2 X |

CHARLIE T. MOON, *Primary Examiner.*

R. F. DROPKIN, *Assistant Examiner.*